Figure 2:
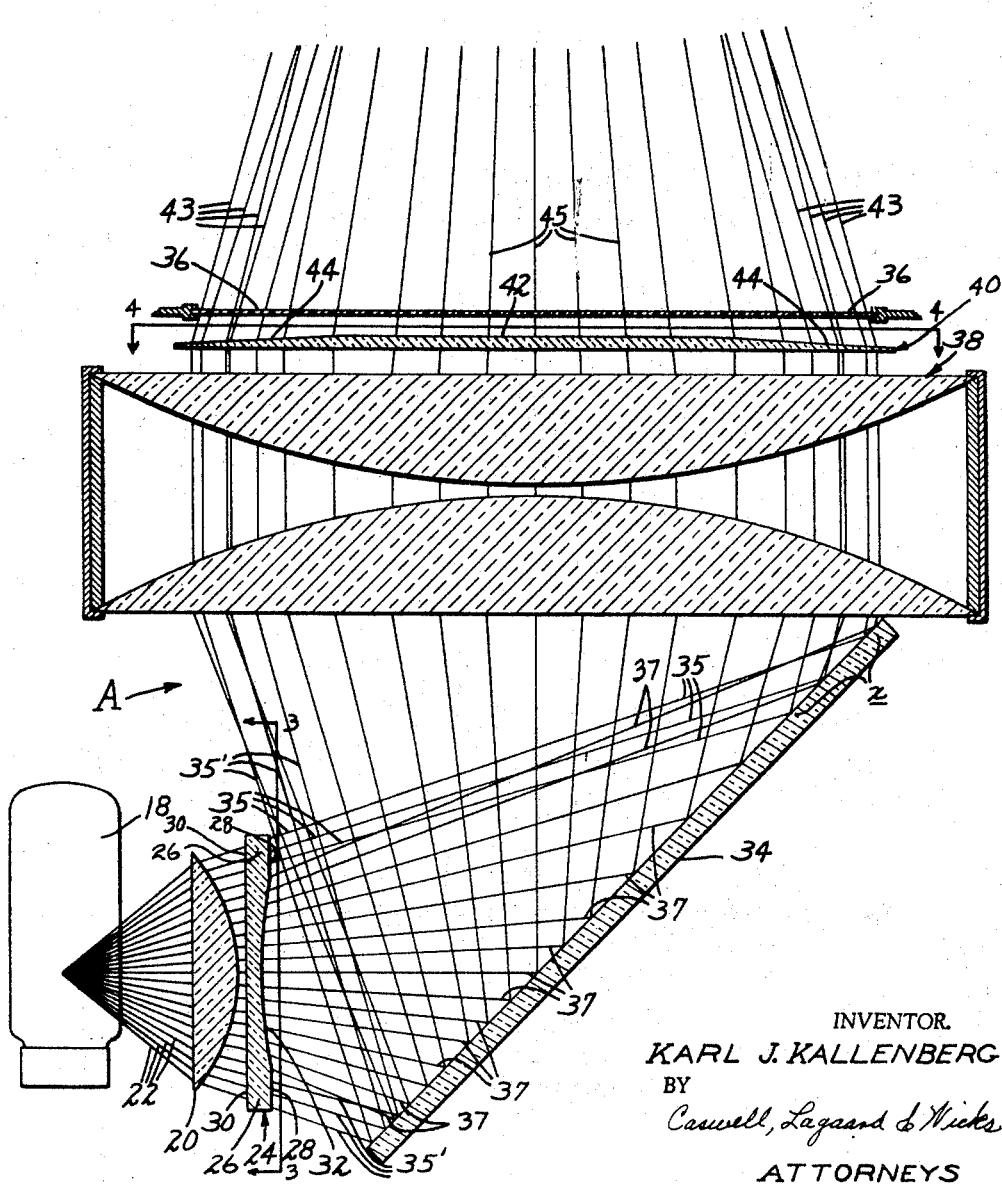

Nov. 17, 1964 K. J. KALLENBERG 3,157,087
OPTICAL LIGHT DISTRIBUTION SYSTEM FOR
A PHOTOGRAPHIC PROJECTION PRINTER
Filed Dec. 26, 1961 2 Sheets-Sheet 1
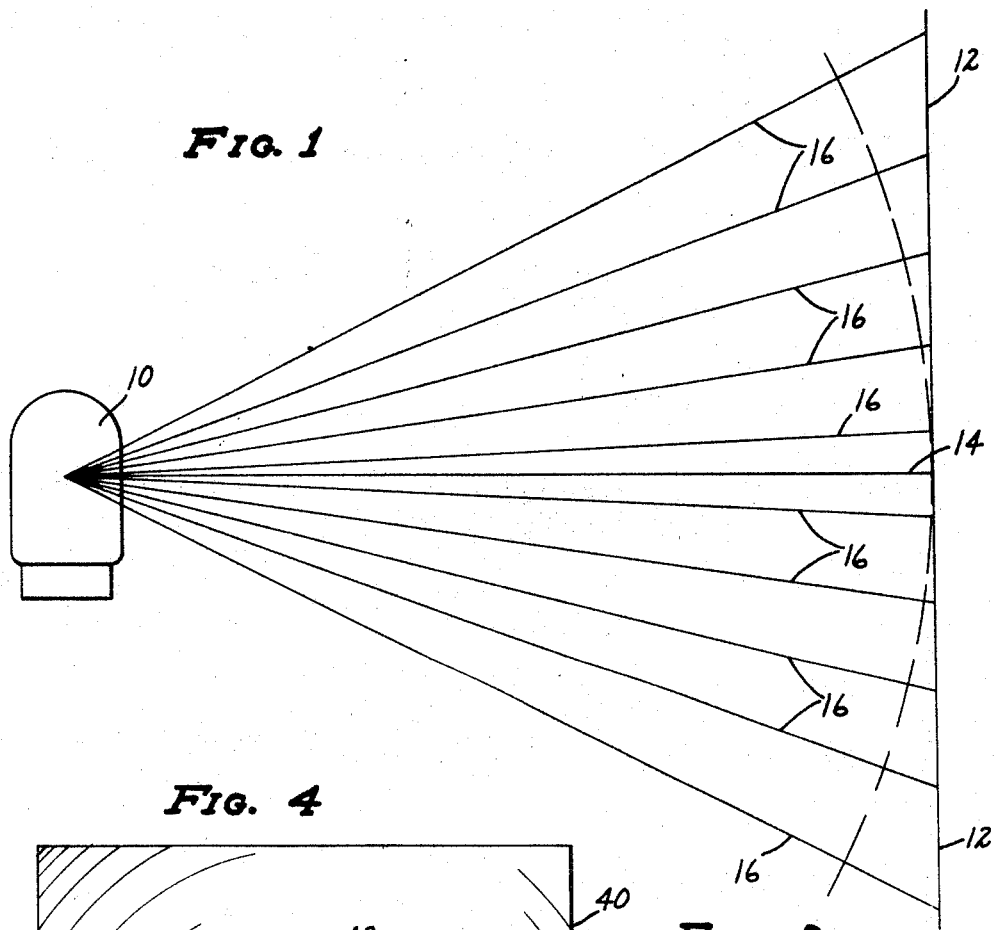
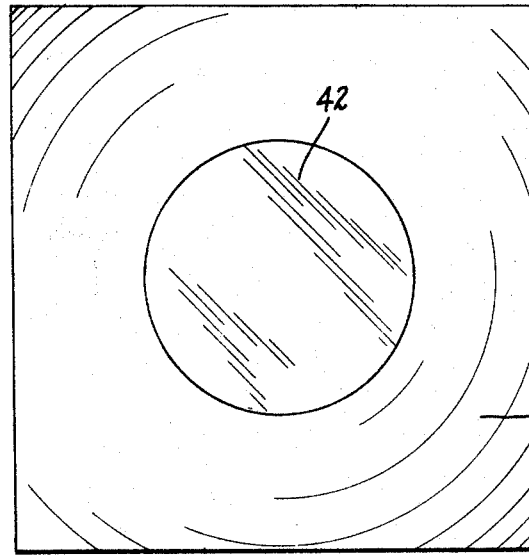
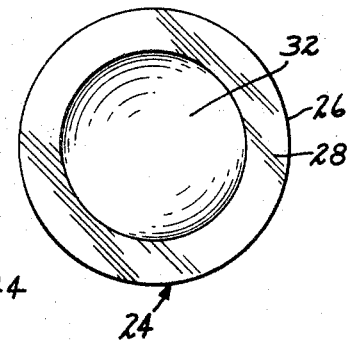
INVENTOR.
KARL J. KALLENBERG
BY
Caswell, Lagaard & Wicks
ATTORNEYS INVENTOR.
KARL J. KALLENBERG
BY
Caswell, Lagaard & Wicks
ATTORNEYS

United States Patent Office 3,157,087
Patented Nov. 17, 1964

3,157,087
OPTICAL LIGHT DISTRIBUTION SYSTEM FOR A PHOTOGRAPHIC PROJECTION PRINTER
Karl J. Kallenberg, Minneapolis, Minn., assignor to Pako Corporation, Minneapolis, Minn.
Filed Dec. 26, 1961, Ser. No. 161,891
4 Claims. (Cl. 88—24)

The invention relates broadly to an improvement in photographic equipment for projection printing and more particularly to an optical system for producing substantially equal light distribution from a point source to and through the negative to be printed.

It is known that light from a point source incident upon a flat surface such as a negative, produces uneven illumination thereof from the center outwardly. Light which is emitted from what conveniently will be referred to as a point source radiates uniformly in all directions, and the illumination varies inversely by the square of the distance. Therefore light emitting from a point source which is incident upon a portion of or an entire sphere describes a surface which is equidistant from the source and illuminated uniformly. In projection printing, illumination is made upon a flat surface, and a ray of light striking a flat surface tangential to the radius ray produces a more intense illumination upon the flat surface at the point of tangency and less intense upon the flat surface at the outer areas, that is, the further we measure from the radius ray. This is due to the fact that the light has travelled further at points removed from the radius ray.

With present day light distribution systems the undesirable result is that the illumination produced for the projection printing of a print is greater in the center area and the outer areas of the print are deficient as a result. It is these outer areas that have plagued the producers of prints.

It is an object of the invention to provide an optical light distribution system for projection printing which produces a more uniform level of illumination by the printing light upon light sensitive material via an image formng lens.

It will not be here attempted to set forth and indicate all of the various objects and advantages incident to the invention, but other objects and advantages will be referred to in or else will become apparent from that which follows.

The invention will appear more clearly from the following detailed description when taken in connection with the accompanying drawings, showing by way of example a preferred embodiment of the inventive idea wherein like numerals refer to like parts throughout.

In the drawings forming part of this application:
FIGURE 1 is a diagrammatic illustration of illumination from a point light source to illustrate uneven illumination upon a flat surface.
FIGURE 2 is a diagrammatic illustration of a light distribution system embodying the invention.
FIGURE 3 is a top plan view of the diverging lens on the line 3—3 of FIGURE 2.
FIGURE 4 is a top plan view of the diffusing lens on the line 4—4 of FIGURE 2.

Referring to the drawings in detail, in FIGURE 1 is found an illustration of illumination of a flat surface from what is generally referred to as a point light source. In FIGURE 1 is included the light source 10 and the flat surface 12. Light emitted from light source 10 radiates uniformly in all directions, and the central portion of the radiation with respect to 12 is indicated by the radial light ray line 14. Further portions of the radiation are indicated by the radial light ray lines 16. It will be seen that the illumination produced on surface 12 at the central radial light ray line 14 is greater in intensity than that produced by the radial light ray lines 16 due to the greater distance of travel to the surface 12 by rays 16.

The intensity of illumination on surface 12 becomes less intense the farther away from central ray 14 the measurement is made in the direction of rays 16. The rays 14 and 16 illustrated when transmitted through conventional condensing lenses to the flat surface of a negative result in more intense light incident upon the center area thereof, and the resultant printing of a sensitized paper therefrom to form a print results in a print deficient in the outer areas thereof. This is true to a greater degree where one dimension of the negative is greater than the other as compared with a square negative.

Referring again to the drawings, in FIGURE 2 the letter A designates the light distribution system and the same includes the light source 18. Further included is a first condenser lens 20 (of the plano-convex type) positioned with its plane surface adjacent the light source 18. The numeral 22 indicates a series of lines representing rays of light emitted from the source 18. The rays 22 pass through the first condenser 20 where the same are bent slightly centrally thereof. A diverging lens 24 is positioned closely adjacent the first condenser 20. The diverging lens 24 (non-image forming) is formed with an annular peripheral outer portion 26 having parallel surfaces 28 and 30 and the central inner portion 32 which is circular and concave in section. Due to the parallel surfaces 28 and 30 of lens 24 there is a very slight change in direction of the light rays passing therethrough. The central portion 32 of diverging lens 24 has the effect of spreading the light rays.

Further provided is the light-folding mirror 34 which reflects the light rays coming from the diverging lens 24. The mirror 34 receives the rays 35, for example, from the outer portion 26 (surfaces 28 and 30) of the lens 24 and these rays form an outer band indicated at area X reflected from the mirror 34 virtually uneffected by the lens element 24 due to the parallel surfaces 28 and 30 forming the outer portion. The rays indicated as 35 and 35' passing through and from the outer portion 26 of lens 24 having the greatest distance to travel ultimately to negative 36 will normally produce the smallest amount of light.

With the central concave diverging portion 32 of lens 24 the light rays 37, for example, passing therethrough and from are spread and thereby "fill in" generally outwardly of the central ray. The diverged rays 37 produced by area 32 of lens 24 combine with the rays passing through portion 26 of lens 24 to thereby create even illumination on a flat surface perpendicular to the central ray. The rays 37 spread or diverged by diverging lens 24 must be redirected to be further useful, and this is done by passing the rays from mirror 34 through a second condenser lens 38. The condenser lens 38 redirects the rays generally, and the condenser system necessary depends upon the size of the machine and the area desired to be covered. The mirror may be dispensed with if the condenser 38 is turned 90° and in axial alignment with lens 24.

Further provided is a diffusing lens 40 positioned adjacent the second condenser lens 38 opposite to said mirror 34. The diffusing lens 40 has a relatively large circular central portion 42 which is substantially flat with substantially parallel surfaces with little variation in thickness throughout but with the outer portion 44 the surface of which diverges on the top surface towards the outer edge thus forming a tapering peripheral area portion or conical form 44 surrounding the central portion 42. The rays coming from second condenser 38 strike the diffusing lens 40, and the central rays such as 45 passing through the central portion 42 of lens 40 are not appreciably affected in direction due to the substantially parallel opposed surfaces. The rays such as 43 passing through and from the outer portion of the second condenser 38 and through the outer portion 44 of the diffusing lens 40 will be refracted inwardly at a greater degree than the rays 45 at the inner portion 42 of the portion 44. Lens 40 reorients the light rays from second condenser 38 and directs the same through negative 36 in substantial equal distribution throughout the same and further directs the rays toward image forming lens 46 which would normally not pass through the lens 46.

The effect is that element 24 produces a more even intensity of light upon diffusing lens 40, and lens 40 then redirects the light rays through negative 36 and toward the image forming lens 46. As a result the sensitized material at a point after the image forming lens 46 receives a much greater degree of even light distribution than heretofore possible.

The invention is not to be understood as restricted to the details set forth since these may be modified within the scope of the appended claims without departing from the spirit and scope of the invention.

Having thus described the invention, what is claimed as new and desired to be secured by Letters Patent is:

1. In a light distribution system for a photographic projection printer interposed between a light source and an image forming lens, a plano-convex condenser lens for converging light rays emitted from a light source, a diverging lens coaxial with and in spaced relation to said first condenser lens, said diverging lens including a substantially central portion being concave in formation, the remaining outer portion of said diverging lens having parallel surfaces with substantially no effect on the light rays passing therethrough, said concave portion of said diverging lens adapted to diverge light rays passing therethrough from said first condenser lens to the outer areas of the light ray projection of said diverging lens to intensify said outer areas, a second condenser lens means positioned in spaced relation and adjacent said diverging lens for redirecting light rays passing from said diverging lens, a diffusing lens positioned in spaced relation to and adjacent said second condenser lens including a substantially central portion having parallel surfaces with substantially no effect on the light rays passing therethrough, the remaining outer portion diverging from the central portion to the outer edge for refracting the rays passing therethrough so that the same are received by the image-forming lens.

2. In a light distribution system for a photographic projection printer interposed between the light source and an image forming lens, the combination of a plano-convex condenser lens for converging light rays emitted from a light source, a diverging lens positioned in axially aligned spaced relation to and adjacent said condenser lens a portion of which is formed to diverge light rays passing substantially centrally therethrough to the outer areas of light ray projection of said diverging lens, a mirror positioned adjacent said diverging lens to fold the light rays incident upon the same coming from said diverging lens, condenser lens means positioned in axially aligned spaced relation to and adjacent said mirror for redirecting rays passing from said diverging lens, a diffusing lens positioned in axially aligned spaced relation to and adjacent said second condenser lens and having a portion formed to refract light rays passing through the outer peripheral portion thereof from said second condenser and direct the rays so that the same are received by the image forming lens, and means for positioning a negative adjacent said diffusing lens for projection of the image thereon to the image-forming lens.

3. In a light distribution system for a photographic projection printer interposed between a light source and an image forming lens, a plano-convex condenser lens positioned in axially aligned spaced relation to said first condenser lens for converging light rays emitted from a light source, a diverging lens, a portion of said diverging lens being concave in formation, the remaining portion of said diverging lens having parallel surfaces with substantially no effect on the light rays passing therethrough, said concave portion of said diverging lens adapted to diverge and spread the light rays passing therethrough from said first condenser lens, condenser lens means positioned in spaced relation to and adjacent said diverging lens for redirecting rays passing from said diverging lens, a diffusing lens positioned in spaced relation to and adjacent said second condenser lens and having a portion formed to refract light rays passing through the outer peripheral portion thereof from said second condenser lens for projection through a negative positioned adjacent the diffusing lens and ultimately to an image forming lens.

4. In an optical system including a light source, an image-forming lens and a projection printer between said light source and said image-forming lens, the combination of a plano-convex lens in spaced relation to and adjacent said light source, a diverging lens in spaced relation to and adjacent said plano-convex condenser lens, said diverging lens being positioned between said conderser lens and said projection printer and having a concave central portion on the surface thereof towards said projection printer, said diverging lens further including an annular aspherical outer surface in communication with the central portion thereof, condenser lens means in spaced relation to and between said diverging lens and said projection printer, and an aspheric diffusing lens in spaced relation to and between said condenser lens means and said projection printer, said diffusing lens having a plane surface on the side thereof towards said condenser lens means and having a central plane surface on the side thereof towards said projection printer, said diffusing lens further having a tapering peripheral surface in radially outwardly surrounding relation to the central plane surface thereof.

References Cited in the file of this patent
UNITED STATES PATENTS

| | | |
|---|---|---|
| 2,140,979 | Bertele | Dec. 20, 1938 |
| 2,336,379 | Warmisham | Dec. 7, 1943 |
| 2,803,996 | Bouwers | Aug. 27, 1957 |
| 2,821,110 | Cook | Jan. 28, 1958 |
| 3,028,793 | Bousky et al. | Apr. 10, 1962 |